(12) United States Patent
Takahashi et al.

(10) Patent No.: US 6,890,682 B2
(45) Date of Patent: May 10, 2005

(54) STRUCTURE FOR HOLDING BATTERY OF ELECTRONIC TIMEPIECE

(75) Inventors: Takashi Takahashi, Chiba (JP); Takayuki Satodate, Chiba (JP); Yuichi Shino, Chiba (JP)

(73) Assignee: Seiko Instruments Inc., Chiba (JP)

( * ) Notice: Subject to any disclaimer, the term of this patent is extended or adjusted under 35 U.S.C. 154(b) by 476 days.

(21) Appl. No.: 09/979,196

(22) PCT Filed: Mar. 23, 2001

(86) PCT No.: PCT/JP01/02373

§ 371 (c)(1),
(2), (4) Date: Feb. 19, 2002

(87) PCT Pub. No.: WO01/77760

PCT Pub. Date: Oct. 18, 2001

(65) Prior Publication Data

US 2003/0118893 A1 Jun. 26, 2003

(30) Foreign Application Priority Data

Apr. 6, 2000 (JP) .................................. PCT/JP00/02249

(51) Int. Cl.⁷ ............................................. H01M 2/10

(52) U.S. Cl. ......................... 429/97; 429/96; 429/100; 429/186; 368/88; 368/298; 368/309; 368/312; 368/316

(58) Field of Search ........................... 429/96, 97, 100, 429/186; 368/88, 203, 204, 298, 309, 312, 316

(56) References Cited

U.S. PATENT DOCUMENTS

| | | | | |
|---|---|---|---|---|
| 4,362,396 A | * | 12/1982 | Perrot | 368/203 |
| 4,407,590 A | * | 10/1983 | Ohno et al. | 368/204 |
| 4,478,524 A | * | 10/1984 | Saitoh et al. | 368/204 |
| 5,922,489 A | * | 7/1999 | Adachi | 429/100 |
| 6,527,584 B2 | * | 3/2003 | Ninomiya | 439/500 |
| 6,587,400 B1 | * | 7/2003 | Line | 368/88 |
| 6,614,725 B2 | * | 9/2003 | Marquis et al. | 368/88 |

* cited by examiner

Primary Examiner—Bruce F. Bell
(74) Attorney, Agent, or Firm—Adams & Wilks (57) ABSTRACT

A battery holding structure for an electronic timepiece has a battery frame having an opening for receiving a battery. The battery frame has a plurality of fittings each having a tapered overhang extending toward the opening for holding the battery in the opening.

17 Claims, 7 Drawing Sheets

PRIOR ART

200~# STRUCTURE FOR HOLDING BATTERY OF ELECTRONIC TIMEPIECE

CROSS-REFERENCE TO RELATED APPLICATIONS

This application is a U.S. national stage application of copending International Application Ser. No. PCT/JP01/02373, filed Mar. 23, 2001 claiming a priority date of Apr. 6, 2000, and published in a non-English language.

BACKGROUND OF THE INVENTION

1. Field of the Invention

The present invention relates generally to battery holding structures and, more specifically, to a battery holding structure for holding a battery in an electronic timepiece.

2. Background Information

Conventionally, in an electronic timepiece of a digital display type or an analog display type, a battery is used as a drive source. Conventionally, as a method of attaching a battery to a timepiece main body, the battery is integrated to the timepiece main body and thereafter, the battery is held by using a separate member for holding the battery such as a battery holder.

Figure 6:
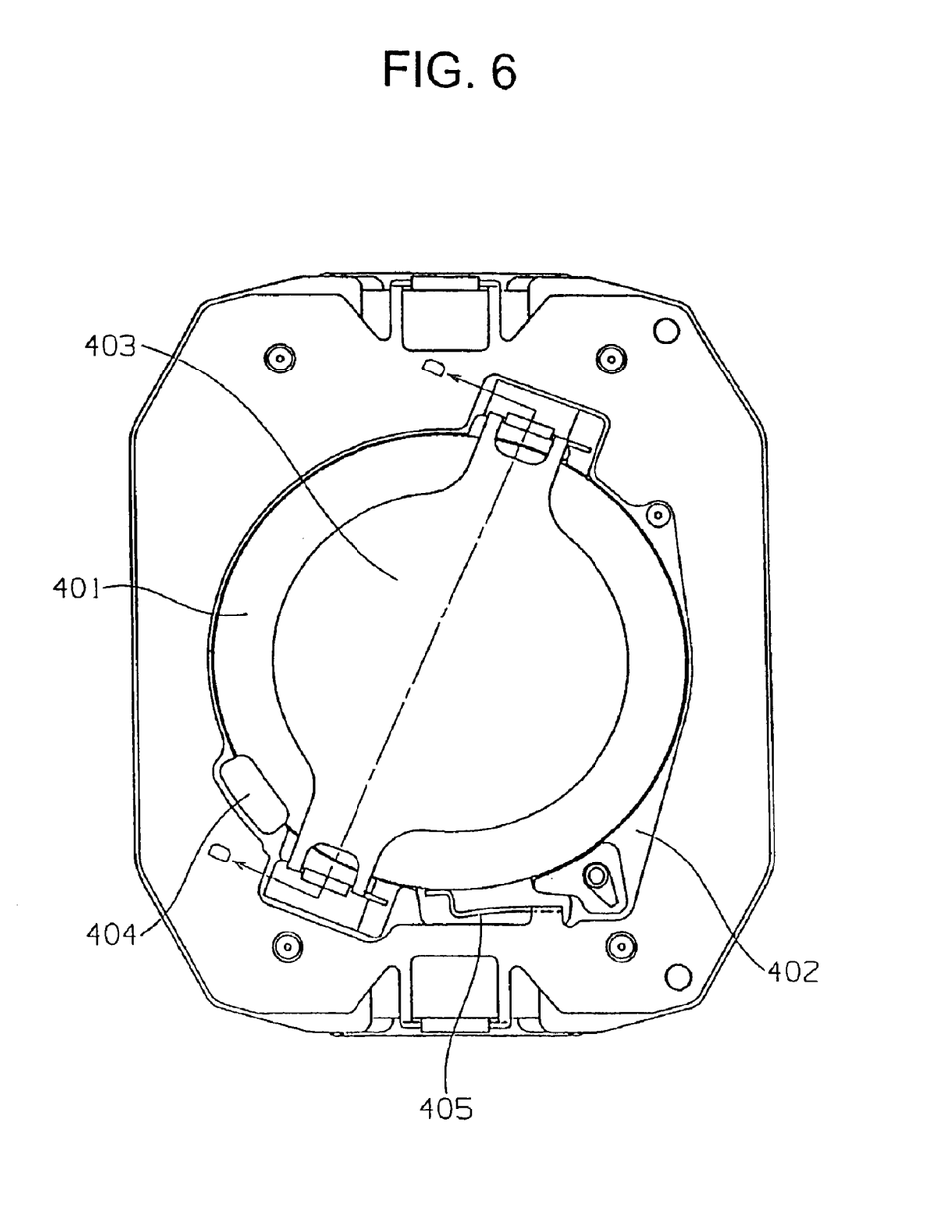
FIG. 6 is a plane view showing a battery holding structure of a conventional electronic timepiece.
Figure 7:
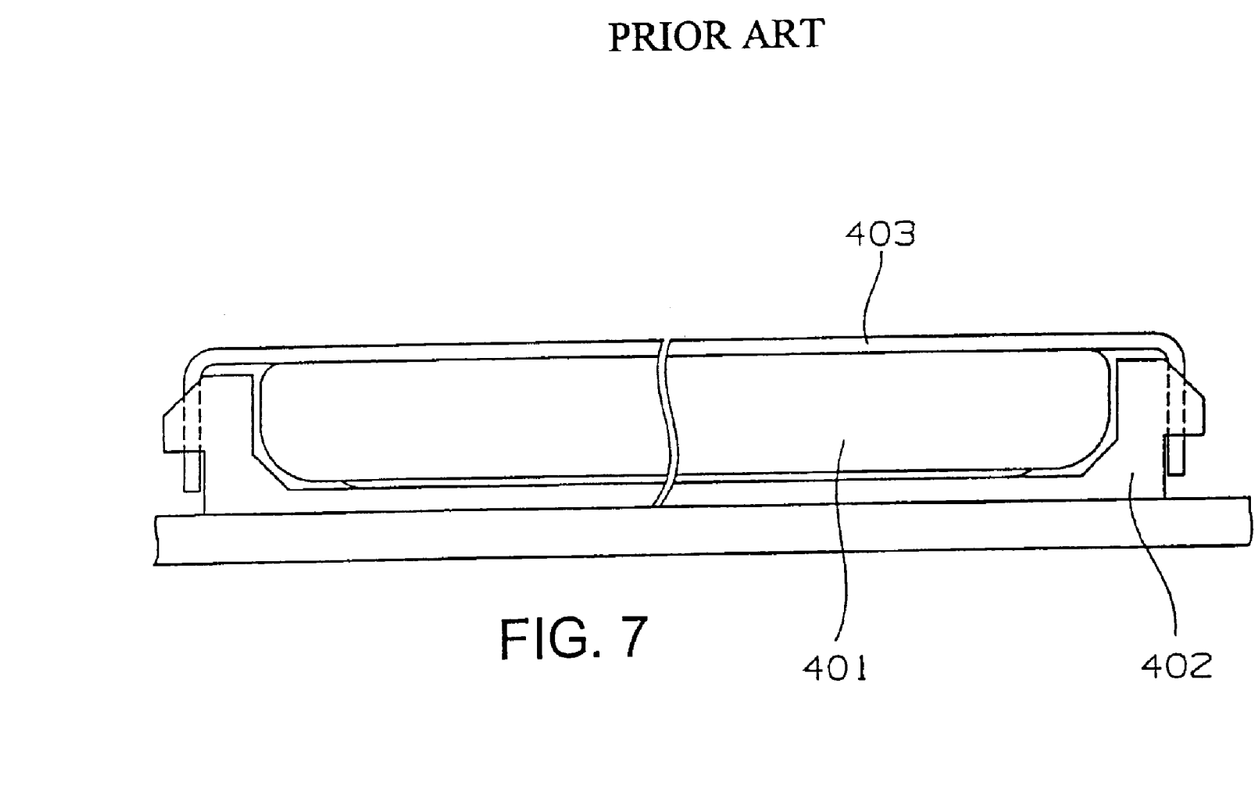
FIG. 7 is a partial front sectional view showing the battery holding structure of the conventional electronic timepiece.

FIG. 6 and FIG. 7 show a battery holding structure of a conventional electronic timepiece using a battery holder. FIG. 6 is a plane view of a periphery of a battery holding structure, and FIG. 7 is a front sectional view along a line D—D in FIG. 6 and the same notations are attached to the same portions.

In FIG. 6 and FIG. 7, numeral 401 designates a battery, numeral 402 designates a battery frame made of resin having an opening portion having a diameter slightly larger than that of the battery 401, numeral 403 designates a battery holder made of a metal constituted by a member separate from that of the battery frame 402, numeral 404 designates an eaves portion integrally formed with the battery frame 402, and numeral 405 designates a positive electrode terminal. When the battery 401 is attached to inside of the battery frame 402, the battery 401 is attached to inside the battery frame 402, the battery 401 is contained in the opening portion of the battery frame 402 to dispose on a lower side of the eaves portion 404 and, thereafter, the battery holder 403 is attached to the battery frame 402 from an upper side of the battery 401. By this construction, a positional shift of the battery 401 in a plane direction is prevented by the battery frame 402. Furthermore, since the battery 401 is sandwiched by the battery frame 402, the battery holder 403 and teh eaves portion 404, a positional shift in a sectional direction and detachment of the battery 401 are prevented. Further, the battery 401 is also held in a state of being brought into electrical contact with the positive electrode terminal 405 and a negative electrode terminal (not illustrated).

As described above, by using the battery holder 403, the battery 401 can be held.

However, according to the above-described conventional battery holding structure, in order to prevent the battery 401 from moving in the sectional direction, the battery holder 403 must be a part separate from the battery frame 402, thereby increasing number of integrating steps and resulting in a complicated and expensive battery holding structure. Further, another problem is that a thickness of the electronic timepiece is increased since the battery holder 403 is arranged to overlap the battery 401.

It is an object of the invention to provide a battery holding structure of an electronic timepiece which is inexpensive to manufacture and has a simple constitution. Further, it is another object of the invention to provide a battery holding structure which allows the thickness of an electronic timepiece to be reduced. Further, it is another object of the invention to provide a battery holding structure capable of holding a battery firmly such that the battery is not positionally shifted even when an electronic timepiece is dropped.

BRIEF SUMMARY OF THE INVENTION

The invention provides a battery holding structure as described below which achieves foregoing aspects.

That is, according to an aspect of the invention, there is provided a battery holding structure of an electronic timepiece characterized in comprising a battery frame having an opening portion for holding a battery, wherein the battery frame is provided with engaging portions projected to a side of the opening portion and having eaves portions provided with tapers. The battery is inserted into the opening portion and is held by the eaves portions of the engaging portions.

Here, there may be constructed a constitution in which a plurality of the engaging portions are provided and the eaves portions of the engaging portions are provided with the tapers in shapes by which when the battery is attached, the battery is brought into contact with narrow width portions of the eaves portions and thereafter brought into contact with wide width portions thereof.

Further, there may be constructed a constitution in which the engaging portions are constituted by the eaves portions and arm portions having an elasticity for attaching the eaves portions to the battery frame.

Further, there may be constructed a constitution in which the battery frame and the engaging portions are integrally molded by an insulating resin.

Furthermore, there may be constructed a constitution in which the eaves portions are integrally formed with projected portions which are brought into contact with a case back in a state of being mounted with the case back.

Further, there may be constructed a constitution in which at least portions of the projected portions are constituted to project to the side of the opening portion more than inner wall faces of the engaging portions and are brought into contact with the case back at positions projected to the side of the opening portion more than the inner wall faces.

Further, the battery may be a button battery.

Further, the electronic timepiece may be an electronic wristwatch.

DETAILED DESCRIPTION OF THE PREFERRED EMBODIMENTS

A detailed explanation will be given of specific examples of battery holding structures of an electronic timepiece according to the invention with reference to the drawings as follows.

Figure 1:
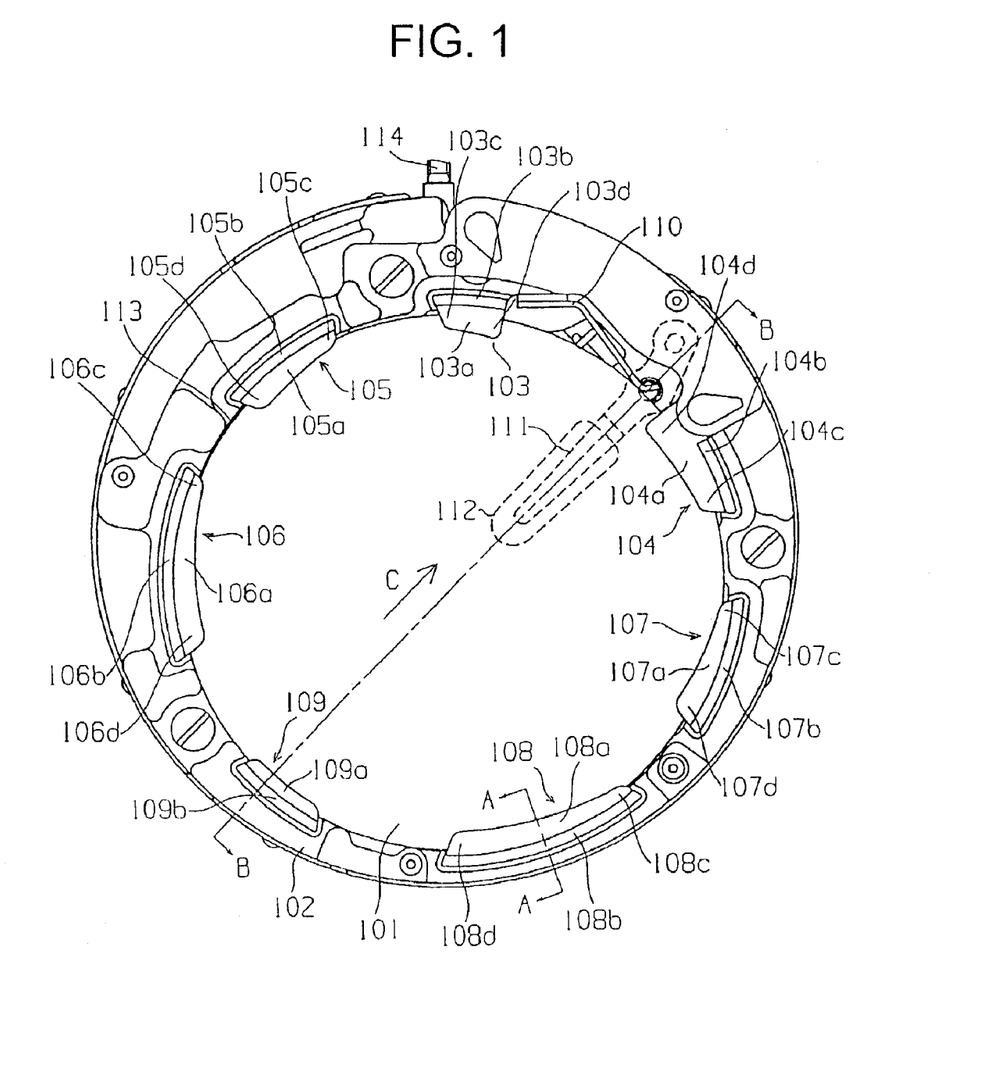
FIG. 1 is a plane view showing a specific example of a battery holding structure of an electronic timepiece according to the invention.
Figure 2:
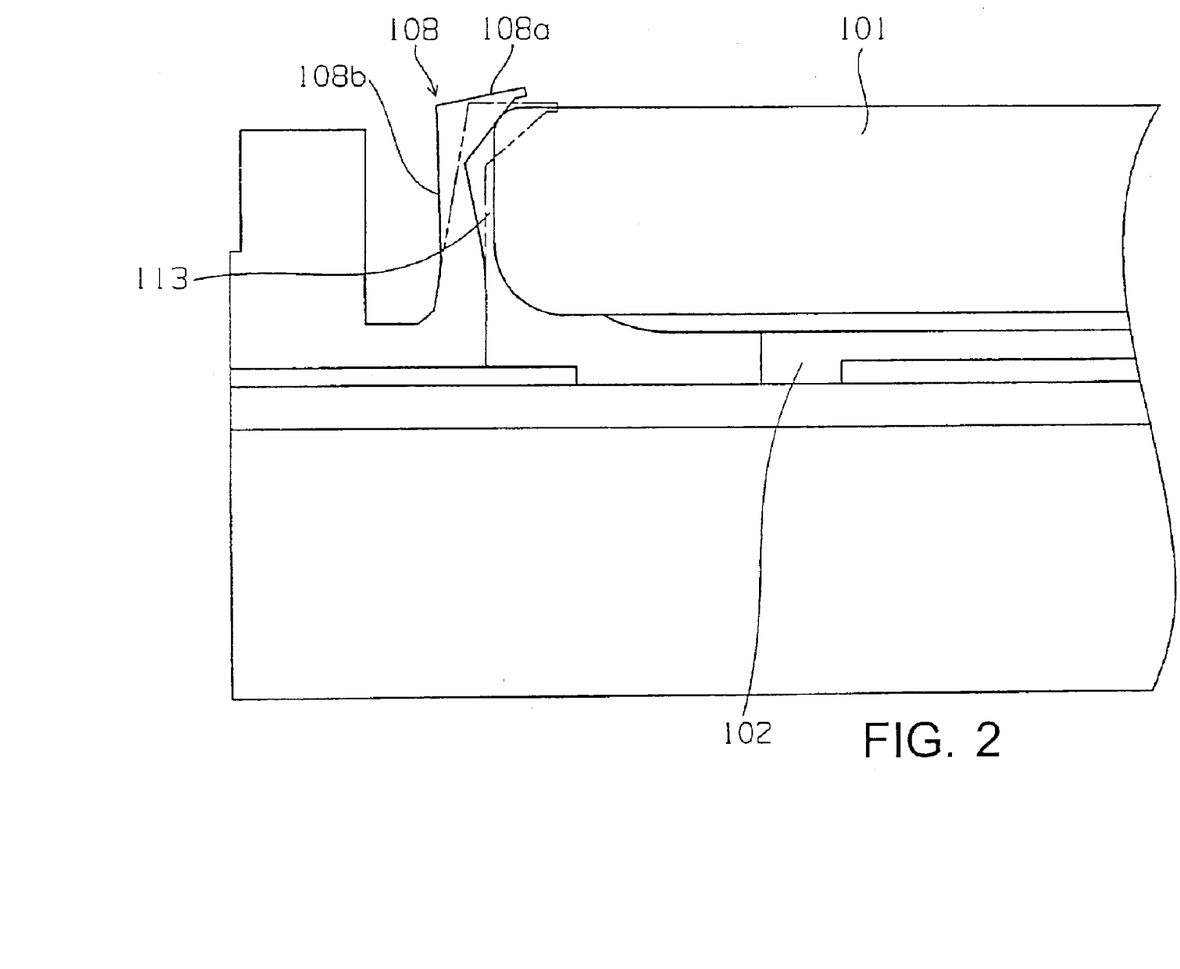
FIG. 2 is a partial front sectional view showing the specific example of the battery holding structure of the electronic timepiece according to the invention.

FIG. 1 is a plane view showing a specific example of a battery holding structure of an electronic timepiece according to the invention, showing an example of an electronic wristwatch. Further, FIG. 2 is a front sectional view taken along a line A—A of FIG. 1. Further, in FIG. 1 and FIG. 2, there is shown a state of holding a battery in a battery frame and the same portions are attached with the same notations.

In FIG. 1 and FIG. 2, numeral 101 designates a button battery which is a kind of battery, numeral 102 designates a battery frame made of insulating resin having an openign portion 113 having a diameter slightly larger than that of the battery 101, numerals 103 through 109 designate a plurality of fittings or engaging portions constituted by molding insulating resin integrally with the battery frame 102, numeral 110 designates a positive electrode terminal, numeral 111 designates a negative electrode terminal having elasticity urged to project from a hole 112 formed at a bottom portion of the battery frame 102 and numeral 114 designates a winding stem.

The engaging portions 103 through 109 have overhang or eave portions 103a through 109a, respectively, projected to sides of the opening portion 113 for preventing a positional shift in a sectional direction or detachment of the battery 101, and arm portions 103b through 109b, respectively connecting the eave portions 103a through 109a to the battery frame 102 and having elasticity for restricting a positional shift of the battery 101 in a plane direction.

The eaves portion 105a through 108a of the plurality of engaging portions 105 through 108, are provided with tapers in shapes by which when the battery 101 is attached, the battery 101 is brought into contact with narrow width portions 105c through 108c of the eaves portion 105a through 108a and thereafter brought into contact with wide width portions 105d through 108d thereof.

Further, the eaves portion 109a of the engaging portion 109 is not provided with taper. Further, although the eaves portion 103a and 104a of the engaging portions 103 and 104 are provided with tapers and respectively formed with narrow width portions 103c and 104c and wide width portions 103d and 104d, at an initial stage of attaching the battery 101, one end portion of the battery 101 is inserted into lower sides of the eaves portion 103a and 104a and therefore, it is not necessarily needed to provide the tapers to the eaves portions 103a and 104a.

Figure 3:
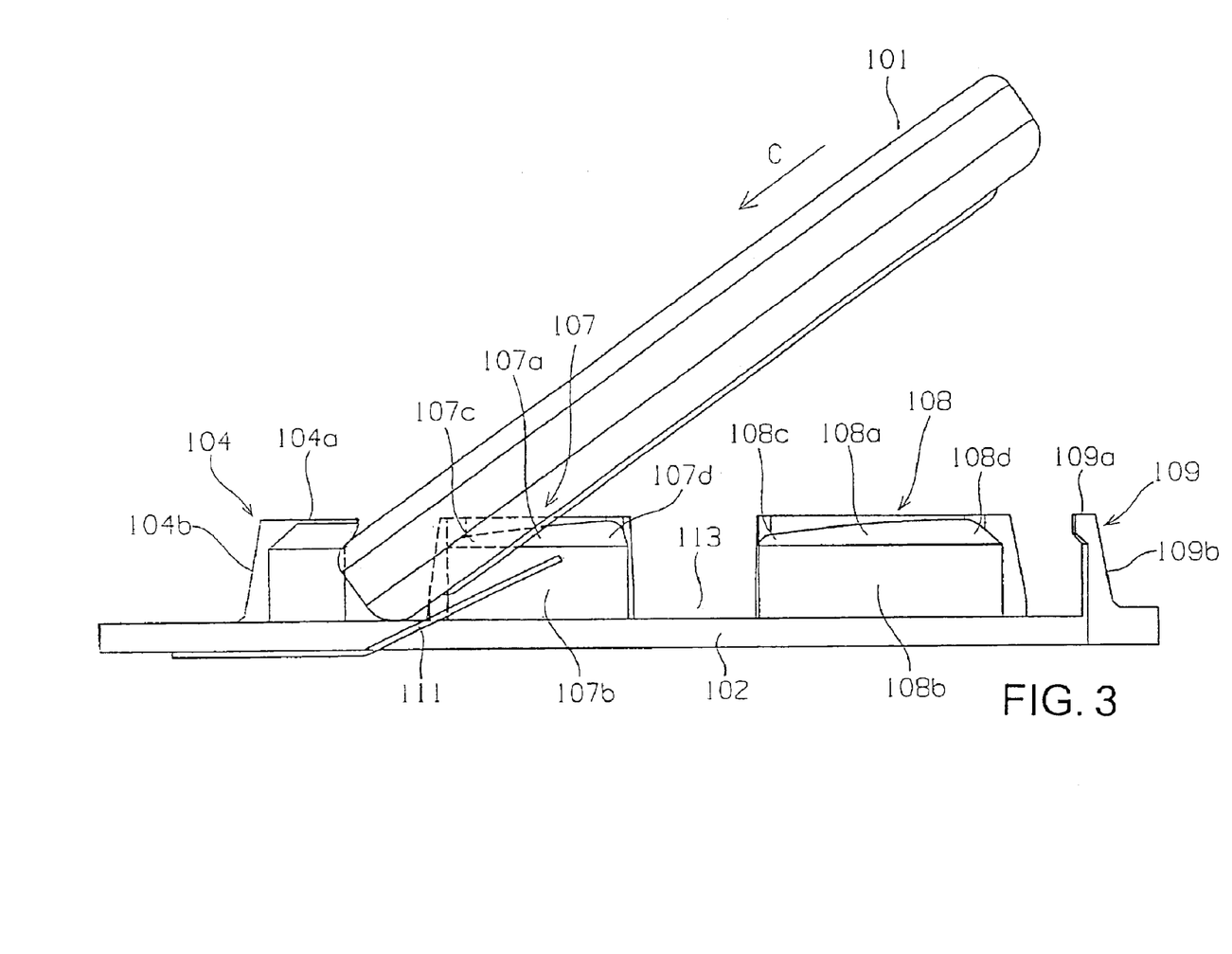
FIG. 3 is a front sectional view showing a mode of use of the specific example of the battery holding structure of the electronic timepiece according to the invention.

FIG. 3 is a front sectional view showing a mode of use when the battery 101 is attached to inside of the battery frame 102, showing a sectional view in correspondence with a B—B section of the battery frame 102 in FIG. 1.

A detailed explanation will be given of the specific example in reference to FIG. 1 through FIG. 3 as follows.

When the battery 101 is attached to inside of the battery frame 102, first, in a previously determined direction of inserting the battery 101, that is, along an arrow mark C direction, one end edge portion of the battery 101 is inserted into an interval between the negative electrode terminal 111 and the eaves portion 103a and 104a of the engaging portions 103 and 104 and is brought into contact with an inner peripheral edge of the battery frame 102 (refer to FIG. 3).

Under the state, the battery 101 is depressed from above such that other end edge portion of the battery 101 is disposed on a lower side of the eaves portion 109a of the engaging portion 109. The battery 101 is successively brought into contact with the narrow width portions 105c through 108c of the eaves portions 105a through 108a of the engaging portions 105 through 108 and the wide width portions 105d through 108d, when the battery 101 is further depressed, as shown by broken lines of FIG. 2, at inside of the battery frame 102, the battery 101 is brought to lower sides of the eaves portions 103a through 109a of the engaging portions 103 through 109 and the battery 101 is contained and held at inside of the opening portion 113 of the battery frame 102.

At this occasion, since the eaves portions 105a through 108a are provided with the tapers, when the battery 101 is contained and held at inside of the opening portion 113 as described above, by successively bringing a peripheral edge of the battery 101 into contact with the eaves portions 105a through 108a, as shown by bold lines of FIG. 2, the arm portions 105b through 108b having elasticity are successively bent to expand and the eaves portions 105a through 108a are also expanded. Thereby, the battery 101 can easily be contained at a holding portion thereof of FIG. 1 and FIG. 2. The battery 101 is contained and held at inside of the opening portion 113 of the battery frame 102 and a positive electrode and a negative electrode of the battery 101 are respectively held in a state of being brought into electrical contact with the positive electrode terminal 110 and the negative electrode terminal 111.

When the battery 101 is held at inside of the opening portion 113 of the battery frame 102 in this way, the battery 101 is prevented from being positionally shifted in the plane direction by a peripheral wall portion of the battery frame 102 and the arm portions 103b through 109b of the engaging portions 103 through 109 and prevented from being positionally shifted in the sectional direction or detached by the eaves portions 103a through 109a. Further, when the battery 101 is interchanged, the battery 101 can easily be removed by using a tool of tweezers or the like.

As has been described above, the battery holding structure of an electronic timepiece according to the specific example of the invention is characterized particularly in having the battery frame 102 having the opening portion 113 for inserting and holding the battery 101 such as the button battery, in which the battery frame 102 is formed with the engaging portions 105 through 108 having the eaves portions 105a through 108a projected to the side of the opening portion 113 and provided with the tapers.

Therefore, the battery 101 can be held without detachment even when impact such as dropping occurs without using a separate member for restricting movement of the battery 101 in the sectional direction, further, there is achieved an effect that the mountability of the battery 101 to the eaves portions 103a through 109a projected long to the side of the opening portion 113, is excellent.

Further, the structure can be simplified by reducing a number of parts, further, since a number of integrating steps can be reduced, shortening of a time period of integration and therefore, a reduction in cost can be achieved.

Further, it is not necessary to arrange a part such as a battery holder to laminate on the battery 101 and therefore, the electronic timepiece can be thinned.

Furthermore, by integrally molding the battery frame 102 and the eaves portions 103 through 109 by insulating resin, an insulating plate or the like is dispensed with.

Further, although according to the specific example, the button battery 101 is used as the battery 101, a battery having other shape may be used. Further, although an explanation has been given of the example of the electronic wristwatch, the invention is applicable not only to the electronic wristwatch of a digital display type or an analog display type but also to various electronic timepieces of a battery drive type such as a-wall type electronic timepiece, a desk-top type electronic timepiece and so on.

Figure 4:
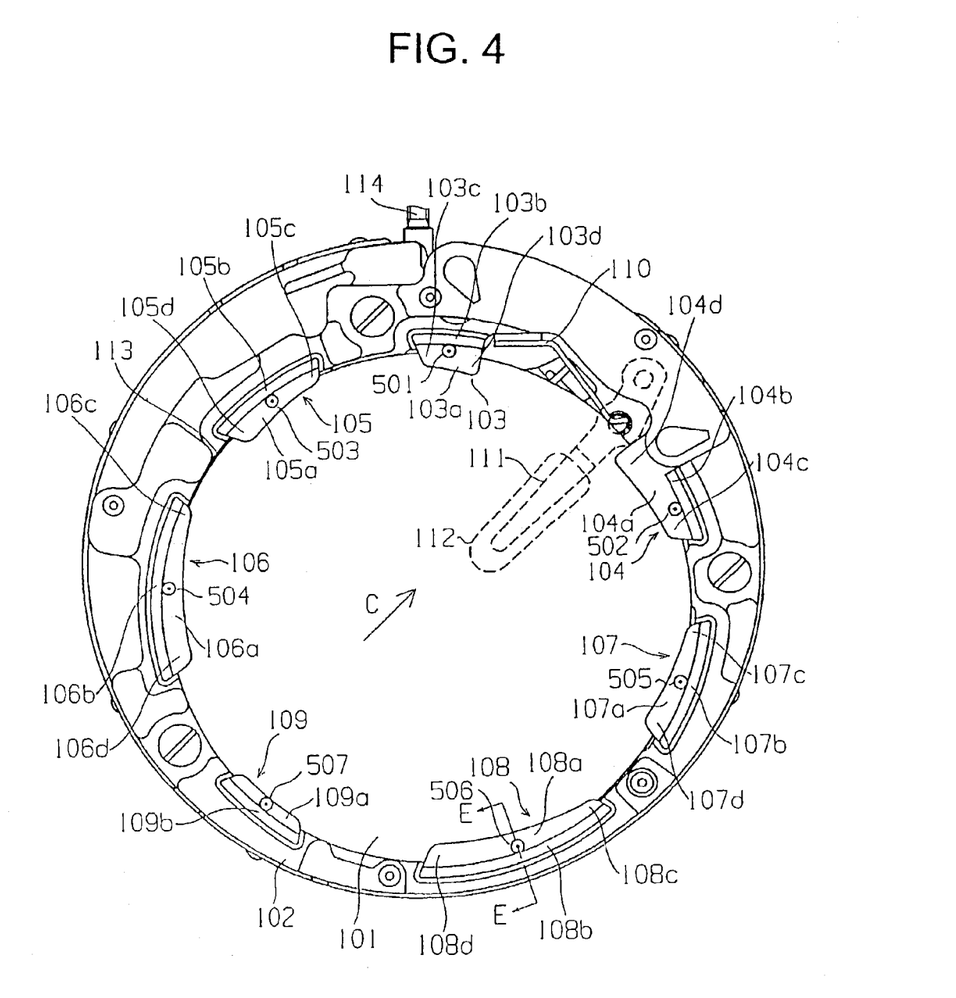
FIG. 4 is a plane view showing another specific example of a battery holding structure of an electronic timepiece according to the invention.
Figure 5:
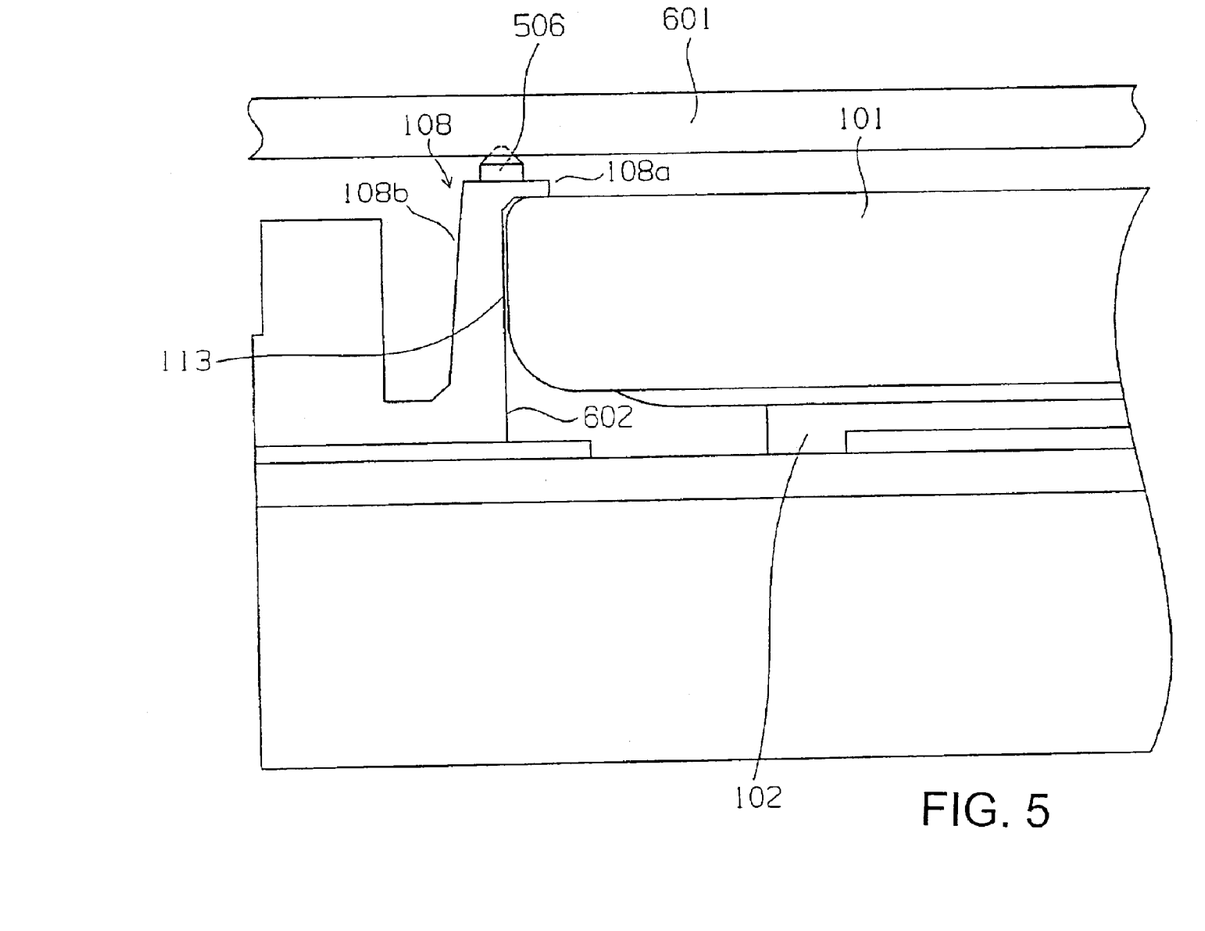
FIG. 5 is a partial front sectional view showing the other specific example of the battery holding structure of the electronic timepiece according to the invention.

FIG. 4 is a plane view showing other specific example of a battery holding structure of an electronic timepiece according to the invention and FIG. 5 is a front sectional view taken along a line E—E of FIG. 4. Further, in both of the drawings, the same portions are attached with the same notations and portions the same as those of FIG. 1 through FIG. 3 are attached with the same notations. Further, FIG. 4 shows a drawing omitting a case back.

A difference between the specific example and the specific example shown in FIG. 1 through FIG. 3, resides in forming projected portions 501 through 507 integrally with the respective eaves portions 103*a* through 109*a* in order to firmly prevent positional shift in the sectional direction or detachment of the battery 101, the method of inserting and holding the battery 101 and the like stays the same and therefore, an explanation will mainly be given of the plurality of projected portions 501 through 507 as follows.

In FIG. 4 and FIG. 5, the respective projected portions 501 through 507 are molded by insulating resin and molded integrally with the respective eaves portions 103*a* through 109*a* on sides of a cover member or case back 601 of the respective eaves portions 103*a* through 109*a*. Front end portions of the projected portions 501 through 507 are constituted to project to the side of the openign portion 113 more than inner wall faces 602 of the arm portions 103*b* through 109*b* of the engaging portion 103 through 109 and are constituted to be brought into contact with the case back 601 at positions projected to the side of the opening portion 113 more than the inner wall faces 602. Further, there is constructed a constitution in which in a state of completing the electronic timepiece by mounting the case back 601 of the electronic timepiece, the case back 601 is brought into contact with the projected portions 501 through 507.

According to the above-described constitution, when the case back 601 is mounted to a main body of the electronic timepiece in a state in which the battery 101 is contained and held at inside of the opening portion 113 of the battery frame 102, first, the case back 601 is brought into contact with the projected portions 501 through 507. Under the state, when the case back 601 is mounted to the main body of the electronic timepiece, the case back 601 is mounted to the main body of the electronic timepiece in a state of pressing the projected portions 501 through 507. At this occasion, the projected portions 501 through 507 are brought into contact with the case back 601 at the positions projected to the side of the opening portion 113 more than the inner wall faces 602 and therefore, the eaves portions 103*a* through 109*a* are bent in the direction of the battery 101 by press force of the case back 601. The battery 101 is solidly held in the state of being pressed by the eaves portions 103*a* through 109*a* at inside of the opening portion 113 of the battery frame 102.

Therefore, the specific example not only achieves an effect similar to that of the above-described specific example but also movement of the battery 101 in the sectional direction can firmly be restricted by the eaves portions 103*a* through 109*a* and therefore, even when the electronic timepiece undergoes impact as in the case of dropping the electronic timepiece, the battery 101 can further firmly be prevented from being shifted positionally or detached.

Further, the projected portions 501 through 507 are brought into contact with the case back 601 at the positions projected to the side of the opening portion 113 more than the inner wall faces 602 and therefore, the eaves portions 103*a* through 109*a* can firmly be pressed to the side of the battery 101 and the battery 101 can be held further firmly. Therefore, an electronic timepiece excellent in impact resistance can be constituted.

Further, it is not necessarily needed to provide the projected portions 501 through 507 at all of the eaves portions 103*a* through 109*a* but at least three of the projected portions may be arranged with excellent balance. Further, pluralities of the projected portions 501 through 507 may be arranged at the respective eaves portions 103*a* through 109*a*. Further, it is also possible to construct a constitution such that the projected portions 501 through 507 are not projected to the side of the opening portion 113 more than the inner wall faces 602 and are brought into contact with the case back 601 at positions at which the projected portions 501 through 507 are not projected to the side of the opening portion 113 from the inner wall faces 602. Also in this case, the arm portions 103*b* through 109*b* are bent by press force of the case back 601 to thereby press the eaves portions 103*a* through 109*a* to the battery 101, thereby, the positional shift of the battery 101 in the sectional direction is prevented.

INDUSTRIAL APPLICABILITY

As described above, the battery holding structure of the electronic timepiece according to the invention is applicable not only to the electronic wristwatch of a digital display type or an analog display type but also to various electronic timepieces of a battery drive type such as a wall type electronic timepiece, a disk-top type electronic timepiece and so on.

What is claimed is:

1. A battery holding structure for an electronic timepiece comprising: a battery frame having an opening for receiving a battery the battery frame having a plurality of fittings each having a tapered overhang extending toward the opening for holding the battery in the opening.

2. A battery holding structure according to claim 1; wherein each of the tapered overhangs has a first portion having a first width and a second portion having a second width greater than the first width, the first and second portions being positioned on the tapered overhang so that when the battery is inserted into the opening of the battery frame, the battery is first brought into contact with the first portion and thereafter is brought into contact with the second portion.

3. A battery holding structure according to claim 2; wherein each of the fittings has an elastic arm portion connecting the overhang to the battery frame.

4. A battery holding structure according to claim 3; wherein the battery frame and the fittings are molded in one pieces from an insulating resin.

5. A battery holding structure according to claim 4; further comprising a cover member for covering the battery when the battery is in the opening of the battery frame: and wherein each of the overhangs has a projecting portion for contacting the cover member when the cover member covers the battery.

6. A battery holding structure according to claim 5; wherein each of the fittings has an inner wall surface portion projecting toward a side of the opening; and wherein at least a part of each of the projecting portions projects more toward the side of the opening than the inner wall surface portions of the fittings.

7. A battery holding structure according to claim 3; further comprising a cover member for covering the battery when the battery is in the opening of the battery frame; and wherein each of the overhangs has a projecting portion for contacting the cover member when the cover member covers the battery.

8. A battery holding structure according to claim 2; further comprising a cover member for covering the battery when the battery is in the opening of the battery frame; and wherein each of the overhangs has a projecting portion for contacting the cover member when the cover member covers the battery.

9. A battery holding structure according to claim 1; further comprising a cover member for covering the battery when the battery is in the opening of the battery frame; and wherein each of the overhangs has a projecting portion for contacting the cover member when the cover member covers the battery.

10. A battery holding structure according to claim 1; wherein the battery comprises a button-type battery.

11. In combination with an electronic timepiece having a battery for supplying electric power to drive the electronic timepiece, a battery holding structure according to claim 1 for holding the battery.

12. A combination according to claim 11; wherein the electronic timepiece comprises an electronic wristwatch.

13. A combination according to claim 11; wherein the battery comprises a button-type battery.

14. A combination according to claim 11; wherein each of the tapered overhangs of the battery holding structure has a first portion having a first width and a second portion having a second width greater than the first width, the first and second portions being positioned on the tapered overhang so that when the battery is inserted into the opening of the battery frame, the battery is first brought into contact with the first portion and thereafter is brought into contact with the second portion.

15. A combination according to claim 11; wherein each of the fittings of the battery holding structure has an elastic arm portion connecting the overhang to the battery frame.

16. A combination according to claim 11; wherein the battery frame and the fittings of the battery holding structure are molded in one piece from an insulating resin.

17. A combination according to claim 11; further comprising a cover member for covering the battery when the battery is in the opening of the battery frame; and wherein each of the overhangs of the battery holding structure has a projecting portion for contacting the cover member when the cover member covers the battery.

* * * * *